United States Patent [19]
Wilcock

[11] 3,873,206
[45] Mar. 25, 1975

[54] METHOD FOR DETERMINING A SPECIFIC CHARACTERISTIC OF FLUID SUSPENDED PARTICLES

[75] Inventor: William Leslie Wilcock, Y Felin Hen near Bangor, England

[73] Assignee: Leeds & Noethrup Company, North Wales, Pa.

[22] Filed: Oct. 3, 1973

[21] Appl. No.: 403,288

[52] U.S. Cl............. 356/103, 356/102, 350/162 ZP
[51] Int. Cl...................... G01n 15/02, G01n 21/00
[58] Field of Search........ 356/102, 103; 350/162 ZP

[56] References Cited
UNITED STATES PATENTS

| | | | |
|---|---|---|---|
| 3,045,530 | 7/1962 | Tsujiuchi | 350/162 ZP |
| 3,451,755 | 6/1969 | Silverman et al. | 356/103 |
| 3,469,921 | 9/1969 | Taylor | 356/102 |

Primary Examiner—Harold A. Dixon
Attorney, Agent, or Firm—William G. Miller, Jr.; Raymond F. MacKay

[57] ABSTRACT

A method for determining a specific characteristic of fluid suspended particles such as determining the total volume of particulate, as in stack gases. A laser beam is passed through the stack gases to produce diffraction patterns which are spatially filtered so that the total diffracted light flux passing through the filter is proportional to the total volume and hence the mass of the particles. A central opaque region is used on the filter to intercept the incident laser beam. The portion of diffracted light which is intercepted by that opaque region is compensated for by a region of enhanced transmission next to the center to restore response relating to the large particles. The spatial filter transmits a fraction of the diffracted light proportional to the reciprocal of the diffraction angle so that the total flux will be proportional to the cube of the diameter of the particulate and hence the particulate volume. When a long path is involved the particle information which is lost is compensated for by an enhanced transmission of the diffracted light from nearby small particles. Thus, in an outer region of the filter the transmission factor is held constant to provide the necessary compensation for the lost light flux.

19 Claims, 12 Drawing Figures

METHOD FOR DETERMINING A SPECIFIC CHARACTERISTIC OF FLUID SUSPENDED PARTICLES

BACKGROUND OF THE INVENTION

This invention relates to a method for determining a specific characteristic of fluid suspended particles by measuring diffracted light. The invention also relates to apparatus for carrying out the novel method.

The invention has particular usefulness in the determination of particulate mass loading in stacks where it may be desirable, for example, to measure the total volume and hence the total mass of entrained particles in a range such as from 2.0 to 100 microns. The method may also be used for a variety of other particulate measurement applications including cement finish grinding control as well as dust respiration and explosion hazard monitoring.

Techniques involving the scattering or diffraction of light as a basis for making measurements of a characteristic of particulates have previously been employed for particles as well as aerosols. Those prior techniques have usually involved the sampling of the angular distribution of diffracted light flux and the inferring from that information the corresponding size distribution of particles in the illuminated path with a conversion being made to total mass based on the assumption of a known relationship between particle density and size.

The prior art devices have generally been utilized for measuring the size of particulates over a short path, whereas application of the same approach introduces new problems when the length of the path over which the measurement is to be made is long, as is the case for through-the-stack measurements of particulates, and when the measurement is to provide a direct measurement of total volume or mass.

The method of this invention relies on the fact that the amount of flux diffracted by a particle is proportional to the square of the particle diameter while the angular scale of the pattern of flux distribution is proportional to the reciprocal of particle diameter so that the diffracted flux density at the center of the pattern is proportional to the fourth power of the particle diameter. Because the proportionality between particle diameter and diffracted flux varies from the fourth power of particle diameter near the center of the diffraction pattern to the second power of particle diameter for the whole diffraction pattern it is possible to attenuate the diffracted flux selectively to achieve proportionality between measured flux and a desired function of particle size.

It is therefore an object of this invention to provide an improved method and means to measure a characteristic of particles such as the volume by the use of an illuminated path. More particularly, it is an object of the invention to provide a means for measuring the total particulate volume by light diffracted from the illuminated path where the path is relatively long with respect to the diameter of the lens system collecting the diffracted light. It is a specific object of this invention to provide for a single flux measurement proportional to particulate volume and hence mass over a long path.

SUMMARY OF THE INVENTION

In carrying out this invention there is provided means for performing the method for measuring the specific characteristic of fluid suspended particles in a certain size range along a path through a sample representative of the particle population in the fluid.

The method includes as a first step the passing of a light beam through a sample of the fluid. The light diffracted from the beam by the suspended particles in the sample is then filtered with a spatial filter having a transmission factor which varies as a function of the distance from the axis of the beam. The manner in which the transmission factor varies as a function of the distance is such that the magnitude of the total light flux transmitted due to each individual particle has a functional relationship to the dimensions of the particle. That functional relationship makes the total light flux transmitted due to all of the suspended particles proportional to the magnitude of the characteristic. The magnitude of the total light flux transmitted is then detected as a measure of the specific characteristic.

DESCRIPTION OF THE PREFERRED EMBODIMENTS

Figure 1:
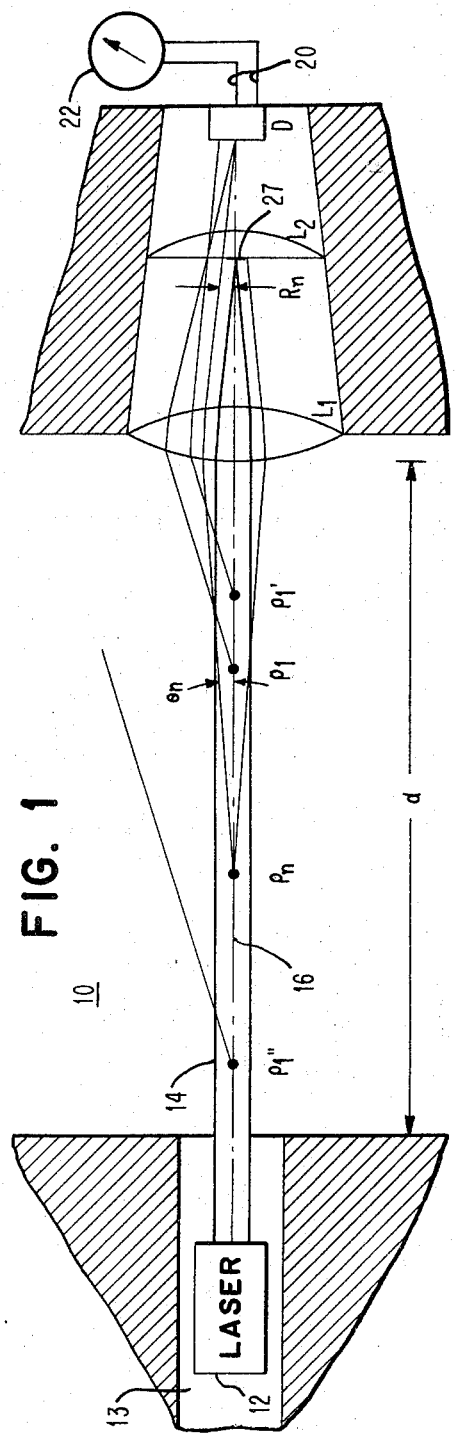
FIG. 1 is a diagram of an arrangement of apparatus for practicing the invention by measuring particulate in a stack.

In FIG. 1 there is shown an arrangement for measuring the volume of particulates in a stack 10 where it is desirable that the volume of the particulate in the size range from $p_l$ to $p_n$ should be measured over a path length $d$ representing essentially the diameter of the stack 10. The stack characteristically may be of large diameter and the particular method here described can be considered practical for diameters ranging up to approximately 20 ft.

Referring to FIG. 1, it will be noted that a lasser 12 located in a chamber 13 in one side of the stack is utilized to produce a laser beam 14. The laser 12 may, for example, be a helium neon laser producing a coherent beam of light having a wave length of 6,328 Angstroms. The laser beam must necessarily be broad enough so that its diameter exceeds the diameter of the largest particle. Alternatively, a well collimated noncoherent source may be used provided that the spectral bandwidth is a small fraction of the nominal wavelength and that the angular beam spread be smaller than the angular size of the diffraction pattern of the largest particles to be measured.

The laser beam 14 will be intercepted by the particles in the stack 10 along the path of the laser throughout its full length $d$ and as a result there will be produced diffraction patterns by the laser beam light which is scattered by the particles. The angle of scatter has a definite relation to the size of the particle. Thus, for example, when the laser beam strikes the largest of the particles in the size range to be measured, namely, the particle $p_n$, the light flux diffracted at an angle $\theta_n$ to the axis of propagation of the laser beam 16 is collected by an optical focusing element such as the collecting lens $L_1$ and focused on a ring at a radius $R_n$ on the first surface of the field lens $L_2$. All particles of the same size wherever located along the path length d will cause diffraction of the laser beam at the same angle so that the total light flux over the solid angle related to that size will fall within the same radius on the front surface of $L_2$ so that the total light flux within that radius is proportional to the number of particles of the particular size. This is demonstrated in FIG. 1 by the light scattered from particles $p_l$ and $p_l'$ which are of the same size.

As will be more fully explained in the subsequent description, the front surface of the lens $L_2$ which is in the Fraunhofer plane of lens $L_1$ carries a filter providing variable transmission of the collected light depending upon the radius from the center of the lens $L_2$. Alternatively, a separate filter element could be used in front of $L_2$. The light transmitted by the lens $L_2$ after passing through the filter is then focused on the detector D which may be a photodetector capable of producing an output on its output lines 20 to the meter 22 proportional to the light flux falling on the detector.

The lens $L_1$ and lens $L_2$ may be combined with the detector D into a unit for mounting in a cavity of the stack opposite cavity 13 so that the laser beam 14 traverses the full diameter of the stack.

When the length of the path d is such that the smallest size particle in the range of particles whose volume is to be measured scatters the light at an angle such that when the particle is at the extreme end of the path d from $L_1$ and the scattered light from that size particle is still at an angle small enough to be collected by the lens $L_1$, then if the particle population is such that multiple scattering and shadowing are not significant factors the transmission of the filter on the front surface of the lens $L_2$ at any particular radius from the center should vary inversely as the distance from the center of the lens $L_2$ so that the fraction of the light transmitted by the filter on the front surface of the lens $L_2$ is smaller for diffraction patterns of larger radii. It has been found that with the transmission varying inversely with the radius the total light flux transmitted to detector D is proportional to the total particulate volume. Thus, the characteristic of volume has been related to the diameter of the particles by the spatial filter on the front surface of $L_2$.

Figure 2D:
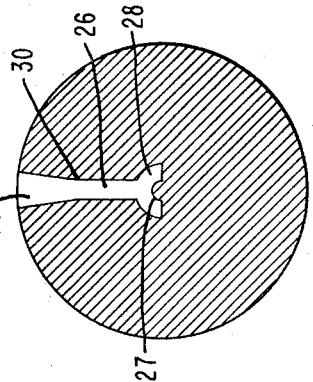
FIGS. 2a–2d are front elevations of filter configurations for carrying out the invention.
Figure 2C:
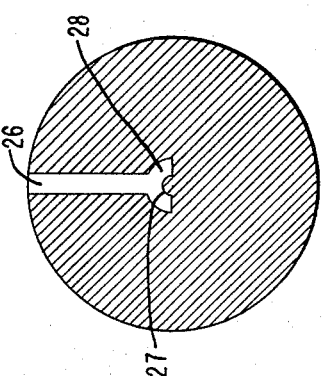
Figure 2B:
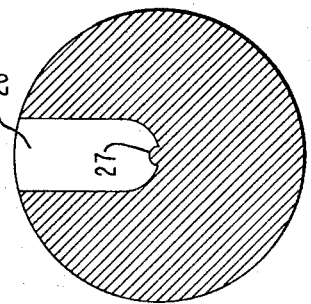
Figure 2A:
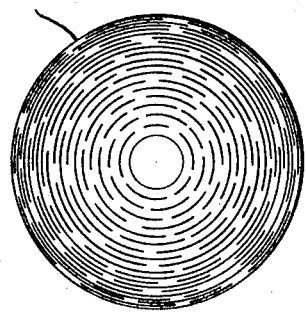
Figure 3A:
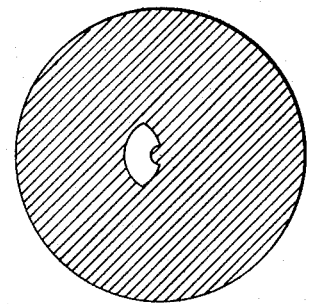
FIGS. 3a–3d are front elevations of filter configurations for carrying out the invention over differing size ranges.
Figure 3B:
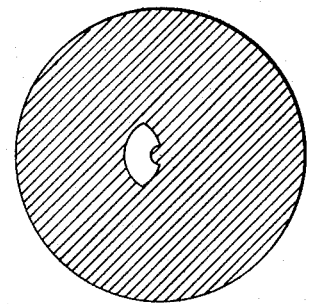
Figure 3C:
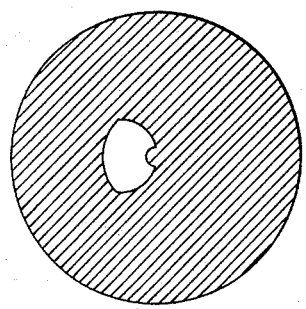
Figure 3D:
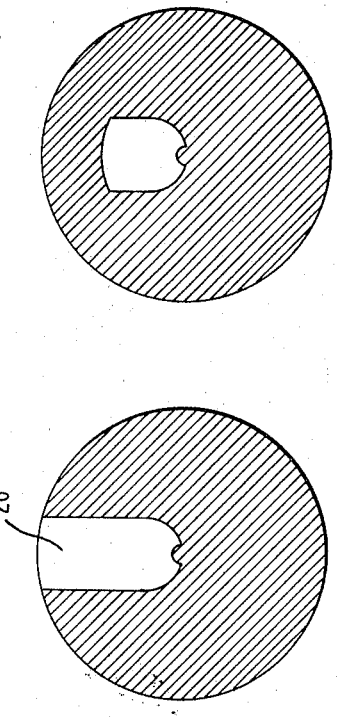

The filter of FIG. 2a is a spatial filter of the variable density type having an opaque central region 23 which is designed to have a diameter sufficient for blocking off the incident light of the illuminating beam of the laser. The transmission of the filter of FIG. 2a is shown as being proportional to $1/\theta$, where $\theta$ is the angle of scatter.

Since the diffraction of light from spherical particles or from randomly oriented irregular particles is symmetrical throughout the solid angle of diffraction, it is possible to use variable area filters instead of variable density filters.

A spatial filter of the variable area type can be utilized in place of the variable density filter shown in FIG. 2a. Such a variable area filter is illustrated by the FIG. 2b. It is opaque in all of the regions except in the region 26 which is fully transparent. The filter of FIG. 2b has an opaque central region 27, corresponding in function to the central opaque region 23 of FIG. 2a. For fabrication convenience, the transparent region 26 of FIG. 2b has a maximum filter factor of one-half and therefore is so designed that the arcuate span of the transparent area 26 at any radius is related to one half the total circular distance at that radius as a reciprocal function of the radius and hence of the angle of scatter, thus providing, effectively, a $0.5/\theta$ transmission factor.

The opaque central region 27 not only blocks off the incident light from the laser beam 14, but also blocks out the central or low angle portion of the diffracted light. This loss of the central portion of the diffraction patterns is insignificant for small particles because their diffraction patterns have relatively large angular scale. For progressively larger particles, the angular scale of the diffraction pattern becomes progressively smaller, so that as particle size increases a progressively larger fraction of the diffracted light is intercepted by the central opaque region. Partial compensation for this loss of large particle information is effected by providing in the spatial filter a region of enhanced transmission immediately surrounding the central opaque region 27.

The effective filter factor of the transparent region of FIG. 2a was given as $0.5/\theta$. This transmission factor would allow for a maximum enhancement of only a factor of 2, but it has been found that an enhancement factor of about 5 is more desirable. To allow for sufficient enhancement, a filter having a nominal transmission of $0.1/\theta$ may be used, thus allowing the enhancement region to have a transmission factor of $0.5/\theta$. Such a filter is illustrated in FIG. 2c showing a central opaque region 27 as before, and enhancement region 28 having a transmission factor of $0.5/\theta$ and finally a transparent region 26 having a transmission factor of $0.1/\theta$.

Referring again to FIG. 1, when the length of the path d is such that some of the light scattered by the more distant smaller particles in the size range of the particles to be measured falls outside the area collected by the lens $L_1$, as for particle $p_l''$, it is then necessary to compensate for that lost light flux by enhancing the fraction of the light transmitted by the outer areas of the filter so that the scattered light which is collected from a nearby small particle can effectively be used to compensate for the loss of light scattered by a distant particle of that same size. It has been shown that an appropriate enhancement should be obtained by employing a filter factor which is constant rather than varying as $K/\theta$ where K is a constant such as the 0.1 used in the description of FIG. 2c.

A spatial filter mask having this provision for distant small particle compensation is illustrated in FIG. 2d as a modification of the filter of FIG. 2c. Thus, in the filter of FIG. 2d the central opaque region 27 is similar to that of the previous filters and the enhanced transmission provided by the area 28 is similar to that of FIG. 2c. Likewise, the transparent area 26 between the enhancement region 28 and the break point 30 beyond which further enhancement is required, provides the same reciprocal relationship, namely, $K/\theta$, as previously described.

The region 26 provides for $K/\theta$ filtering of the collected light only up to the angle of scatter within which light is collected from any point along the full length of the path d. Beyond the break point 30 the region 32 transmits the collected light which has been scattered at an angle larger than the angle for which light may be collected from points over the full length of the path $d$. In the region 32, the filter factor is a constant rather than varying reciprocally with $\theta$, thereby providing enhanced transmission through the filter for light scattered at large angles so as to compensate for vignetting by the collection lens $L_1$ of FIG. 1, of high angle scatter from points distant along the path $d$.

When a spatial filter having a composite filter factor such as that shown in FIG. 2d is used, the amount of scattered light flux transmitted by the filter is representative of the total volume of particulates within the size range to be measured, even though some of the scattered flux from distant small particles is lost due to vignetting by the collection lens $L_1$, and even though some of the flux scattered by all particles is lost due to interception by the central opaque region of the mask, provided that the particle size distribution and the particle concentration are substantially constant over the full path length.

In the forgoing discussion, means were described for achieving uniform proportionality between transmitted flux and particle volume over the widest possible range of particle sizes. In other applications, it is desirable to measure particle volume, and hence mass, within a restricted particle size range or set of size ranges. The spatial filters employed in this invention may be shaped to limit the instrument response to selected narrow particle size ranges.

Figure 4:
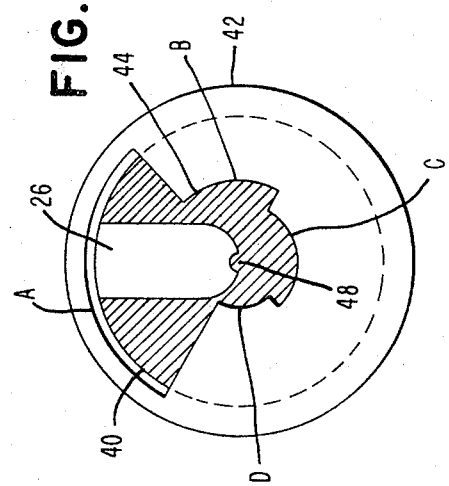
FIG. 4 is a graphic showing of the total transmission of filters of FIGS. 3a–3d.
Figure 5:
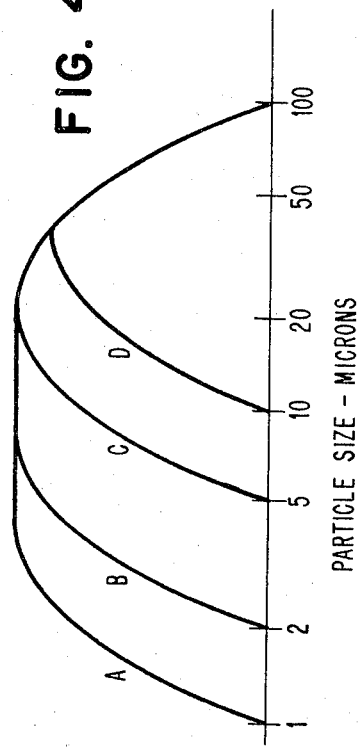
FIG. 5 is a diagram of a shutter arrangement for obtaining the measurements over different size ranges similar to those supplied by the filters of FIGS. 3a–3d.

As shown in FIGS. 3a-3d, which are similar to FIG. 2b, the particle size range of interest may be narrowed by simply providing a filter whose transparent region 26 is reduced in area by making opaque the outer portion which transmits only small particle scatter. Thus, the filter of FIG. 3a may be used to measure particles over a range of 1–100 microns as shown in FIG. 4 whereas the filter of FIG. 3b would be effective over a range of 2–100 microns. The filters of FIGS. 3c–3d would be useful for measuring the particles over the size range of 5–100 and 10–100 microns, respectively. Similarly, selective response to smaller particles can be achieved by increasing the diameter of the central opaque regions 27 of FIGS. 2a–2d. While separate filters such as those shown in FIGS. 3a–3d may be used selectively in FIG. 1 on the front surface of lens $L_2$ or as a separate filter in front of the lens $L_2$, an arrangement such as that shown in FIG. 5 may be utilized to obtain all of the filter mask shapes shown in FIGS. 3a–3d. The arrangement of FIG. 5 utilizes a filter mask 40 of the shape shown in FIG. 2b. With that filter mask overlaid by a shutter 42 which has an opening 44 designed with various radii A, B, C and D which will be effective upon rotation of the shutter 42 about the center 48 to blank off appropriate outer regions of the transparent area 26 in order to selectively limit the size range as described with respect to FIGS. 3a–3d.

Figure 6:
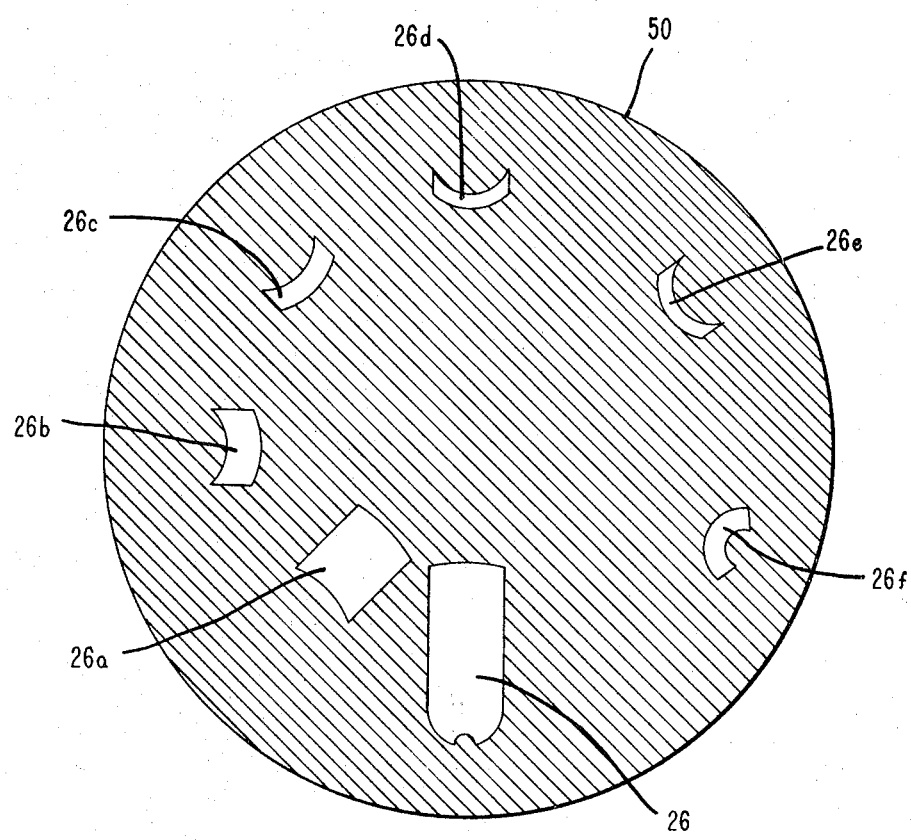
FIG. 6 is a diagram of a shutter for providing selective readings over a variety of size ranges for the particulate.

Still another arrangement for selectively limiting the size range of the particles would be as shown in FIG. 6 where the partial area filter being used can be selected by rotating the selector wheel 50 so that the appropriate transparent area is positioned in front of the lens $L_2$ to provide the measurement in the size range desired. Thus, for example, the transparent region 26 may represent the same region as that represented by the reference character 26 in the other figures while the transparent region 26a would be used to restrict the flux scattered by larger particles so that only the smaller particles would be included in the measurement. On the other hand, the transparent areas 26b–26f are transparent areas provided for measuring a range of particle sizes intermediate between the extremes capable of being measured by the area 26 and can be specially designed to measure those particle sizes of special interest depending upon the applications involved.

In some applications, such as cement finish grinding control, it is desirable to obtain information only on particles above and below certain sizes. In such applications it is possible to use two filter mask configurations such as in FIGS. 3a and 3b which will give response curves such as those shown as A and B, in FIG. 4. This can be accomplished most easily by the use of the shutter arrangement in FIG. 5 with the shutter being adjusted so that the radiuses A and B are used so that the total diffracted light flux measurements will be compared and will correspond to the difference between the response shown by curves A and B. The arrangement of FIG. 6 can perform a similar function without the necessity of the auxiliary shutter shown in FIG. 5. Also, when using the arrangement of FIG. 6 the full range of masks could be used and the mask wheel 50 could be stepped through its seven different positions to provide not only a full range signal but also six lesser range signals which could then be compared as desired to obtain the information required as to the particulate measurements of interest.

It will be evident to those skilled in the art that arrangements for measuring the particulate volume and/or the particulate mass in the stack 10, such as shown in FIG. 1, may require certain provisions for maintaining a clean front surface on the lens $L_1$, as well as means for taking into account variations in the intensity in the laser beam and any fouling of the front surface of the lens $L_1$ which may occur. The lens $L_1$ may be kept relatively clean, for example, by the use of air separately introduced over the front surface of that lens. Also, the laser 12 shown in its housing cavity 13 must be kept clean and isolated from particulates in the stack 10. This may be accomplished by introducing a flow of clean air into the laser housing cavity and allowing it to exhaust into the stack via the hole through which the laser illuminates the particles in the stack.

It is also desirable to use a reference beam which may be created by utilizing some of the energy from the laser, as by means of beam-splitter mirrors, with the resulting reference beam being sent through the lens $L_1$ to the detector D so that by alternately looking at the reference beam and the total diffracted light flux, a ratio between the two may be utilized to provide a reading or measurement which is free of variation due to changes in the intensity in the illumination of the laser 12 as well as the fouling of the surface of the lens $L_1$ which might occur in spite of procedures to prevent such fouling.

It will be evident that specific characteristics of fluid suspended particles other than their volume may be determined by a variation of the method set forth. The third power relationship between the total flux and particle diameter to determine the volume of the particles may be varied by those skilled in the art to obtain other relationships which might be desired to determine other characteristics of suspended particles.

What is claimed is:

1. A method for measuring the specific characteristic of fluid suspended particles comprising the steps of:
passing a light beam through a sample of said fluid, filtering with a spatial filter the light diffracted from said beam by the suspended particles in said sample, said filter having a transmission factor which varies as a function of the distance from the axis of said beam in a manner such that the magnitude of the total light flux transmitted due to each individual particle has a functional relationship to the dimensions of the particle which makes the total light flux transmitted due to all of the suspended particles proportional to the magnitude of said characteristic, and detecting the magnitude of the total light flux transmitted by said filter as a measure of said specific characteristic.

2. The method of claim 1 in which the specific characteristic is the volume of the particles and the transmission factor of the filter varies inversely with the radial distance from the axis of the beam.

3. The method of claim 1 in which the particles are of the same density and the specific characteristic is the mass of the particles with the transmission factor of the filter varying inversely with the radial distance from the axis of the beam.

4. The method of claim 2 in which the light beam is a collimated beam.

5. The method of claim 4 which includes the step of:
collecting with an optical focusing element the diffracted light from the suspended particles in said light beam and wherein said filtering involves the filtering of a portion of the collected light by said spatial filter.

6. A method for measuring the specific characteristic of fluid suspended particles comprising the steps of:
passing a light beam through a sample of said fluid,
filtering with a spatial filter in the Fraunhofer plane, the light diffracted from said beam by the suspended particles in said sample, said filter having a transmission factor which varies as a function of the distance from the axis of said beam in a manner such that the magnitude of the total light flux transmitted due to each individual particle has a functional relationship to the dimensions of the particle which makes the total light flux transmitted due to all of the suspended particles proportional to the magnitude of said characteristic, and
detecting the magnitude of the total light flux transmitted by said filter as a measure of said specific characteristic.

7. A method as set forth in claim 6 which also includes the step of collecting with an optical focusing element the light diffracted from said beam by the suspended particles in said sample and in which the filtering is a filtering of the collected light.

8. Apparatus for measuring a specific characteristic of fluid suspended particles comprising:
means for passing a light beam through a sample of said fluid,
a spatial filter for filtering the light diffracted from said beam by the suspended particles in said sample, said filter having a transmission factor which varies as a function of the distance from the axis of said beam in a manner such that the magnitude of the total light flux transmitted due to each individual particle has a functional relationship to the dimensions of the particle which makes the total light flux transmitted due to all of the suspended particles proportional to the magnitude of said characteristic, and
means for detecting the magnitude of the total light flux transmitted by said spatial filter as a measure of said specific characteristic.

9. Apparatus as set forth in claim 8 in which the specific characteristic is the volume of the particles and the transmission factor of the filter varies inversely with the radial distance from the axis of the beam.

10. Apparatus as set forth in claim 9 in which the light beam passed through the sample of said fluid is a collimated beam.

11. Apparatus as set forth in claim 10 which also includes an optical focusing element for collecting the light diffracted from said beam by the suspended particles in said beam and said spatial filter filters the collected light.

12. Apparatus for measuring a specific characteristic of fluid suspended particles comprising:
means for passing a collimated light beam through a sample of said fluid,
means for collecting with an optical focusing element the forward scattered light from the suspended particles in said light beam,
a spatial filter in the Fraunhofer plane of said optical focusing element, said filter having a transmission factor which varies as a function of the radial distance form the axis of said beam in a manner such that the magnitude of the total light flux transmitted due to each individual particle has a functional relationship to the diameter of the particle with that functional relationship being such that the total light flux transmitted due to all of the suspended particles is proportional to the magnitude of said characteristic, and
means for detecting the magnitude of the total light flux transmitted by said spatial filter as a measure of said specific characteristic.

13. The apparatus as set forth in claim 12 in which the specific characteristic is the volume of the particles and in which the transmission factor of the spatial filter varies inversely with the radial distance from the axis of the beam.

14. A method for measuring the total volume of gas-entrained particles in a certain size range along a path through a sample volume having a uniform distribution of particles in that size range, comprising the steps of:
passing a laser beam along said path,
collecting with an optical focusing element all of the forward scattered light from the particles in said certain size range along the path,
blanking out the incident light from said beam,
filtering with a spatial filter in the Fraunhofer plane of said focusing element the light collected within the radial distance from the axis of the beam representing the angle of scatter of the smallest particles of said size range along the full length of said path so that the fraction of the collected light transmitted varies inversely with the radial distance from the axis of said beam, and
detecting the magnitude of the total light flux transmitted as a measure of the total volume of the particles in said size range along the full length of said path.

15. A method for measuring the total volume of gas-entrained particles in a certain size range along a path through a sample volume having a uniform distribution of particles in that size range, comprising the steps of:
passing a laser beam along said path,
collecting with an optical focusing element all of the forward scattered light from the particles in said certain size range along the path,
blanking out the light flux collected within a radial distance from the axis of the beam representing a small angle of scatter and forming a central region so that the incident light from said beam is not transmitted,
filtering with a spatial filter in the Fraunhofer plane of said focusing element the light collected in an outer region within the radial distance from the axis of the beam representing the angle of scatter of the smallest particles of said size range along the full length of said path so that the fraction of the collected light transmitted varies inversely with the radial distance from the axis of said beam,
filtering with said spatial filter the light collected in a region established between said outer region and said central region so as to transmit a fraction of the light collected in that region which is of magnitude exceeding that which would be transmitted in accordance with an inverse relationship to the radial distance from the axis of said beam by an amount to compensate for the diffracted light blanked out by the central region, and
detecting the magnitude of the total light flux transmitted by said regions as a measure of the total volume of the particles in said size range along the full length of said path.

16. A method for measuring the total volume of gas-entrained particles in a certain size range along a path through a sample volume having a uniform distribution of particles in that size range, comprising the steps of:
passing a laser beam along said path,
collecting with an optical focusing element all of the forward scattered light in said certain size range for particles in a part only of the path and collecting less than all of the forward scattered light from the smaller particles in said size range in the remainder of the path,
blanking out a central region so that the incident light from said beam is not transmitted,
filtering with a spatial filter in the Fraunhofer plane of said focusing element the light collected in an outermost region from the particles with angles of scatter exceeding the maximum angle of scatter of diffracted light for particles in said size range collected over the full length of the path so that the fraction of the collected light transmitted is constant over the radial distance from the axis of said beam represented by those angles of scatter,
filtering with said spatial filter the light collected in an outer region within the radial distance from the axis of said beam represented by the angle of scatter of the smallest particles of said size range collected along the full length of said path so that the fraction of the collected light transmitted varies inversely with the radial distance from the axis of said beam, and
detecting the magnitude of the total light flux transmitted by said regions as a measure of the total volume of the particles in said size range along the full length of said path.

17. A method for measuring the total volume of gas-entrained particles in a certain size range along a path through a sample volume having a uniform distribution of particles in that size range, comprising the steps of:
passing a laser beam along said path,
collecting with an optical focusing element all of the forward scattered light in said certain size range for particles in a part only of the path and collecting less than all of the forward scattered light from the smaller particles in said size range in the remainder of the path,
blanking out the light flux collected within a radial distance from the axis of the beam representing a small angle of scatter and forming a central region so that the incident light from said beam is not transmitted,
filtering with a spatial filter in the Fraunhofer plane of said focusing element the light collected in an outermost region from the particles with angles of scatter exceeding the maximum angle of scatter of diffracted light for particles in said size range collected over the full length of the path so that the fraction of the collected light transmitted is constant over the radial distance from the axis of said beam represented by those angles of scatter,
filtering with said spatial filter the light collected in an outer region within the radial distance from the axis of said beam represented by the angle of scatter of the smallest particles of said size range collected along the full length of said path so that the fraction of the collected light transmitted varies inversely with the radial distance from the axis of said beam,
filtering with said spatial filter the light collected in a region established between said outer region and said central region so as to transmit a fraction of the light collected in that region which is of magnitude exceeding that which would be transmitted in accordance with an inverse relationship to the radial distance from the axis of said beam by an amount to compensate for the diffracted light blanked out by the central region, and
detecting the magnitude of the total light flux transmitted by said regions as a measure of the total volume of the particles in said size range along the full length of said path.

18. A method for measuring the total mass of gas-entrained particles in a certain size range along a path through a sample volume having a uniform distribution of particles of the same density in that size range, comprising the steps of:
passing a laser beam along said path,
collecting with an optical focusing element all of the forward scattered light in said certain size range for particles in a part only of the path and collecting less than all of the forward scattered light from the smaller particles in said size range in the remainder of the path,
blanking out the light flux collected within a radial distance from the axis of the beam representing a small angle of scatter and forming a central region so that the incident light from said beam is not transmitted,
filtering with a spatial filter in the Fraunhofer plane of said focusing element the light collected in an outermost region from the particles with angles of scatter exceeding the maximum angle of scatter of diffracted light for particles in said size range collected over the full length of the path so that the fraction of the collected light transmitted is constant over the radial distance from the axis of said beam, represented by those angles of scatter, filtering with said spatial filter the light collected in an outer region within the radial distance from the axis of said beam represented by the angle of scatter of the smallest particles of said size range collected along the full length of said path so that the fraction of the collected light transmitted varies inversely with the radial distance from the axis of said beam, filtering with said spatial filter the light collected in a region established between said outer region and said central region so as to transmit a fraction of the light collected in that region which is of magnitude exceeding that which would be transmitted in accordance with an inverse relationship to the radial distance from the axis of said beam by an amount to compensate for the diffracted light blanked out by the central region, and detecting the magnitude of the total light flux transmitted by said regions as a measure of the total mass of the particles in said size range along the full length of said path.

19. A method for measuring the total mass of gas-entrained particles in a certain size range along a path through a sample volume having a uniform distribution of particles of the same density in that size range, comprising the steps of:

passing a laser beam along said path, collecting with an optical focusing element all of the forward scattered light in said certain size range for particles in a part only of the path and collecting less than all of the forward scattered light from the smaller particles in said size range in the remainder of the path, blanking out of a central region so that the incident light from said beam is not transmitted, filtering with a spatial filter in the Fraunhofer plane of said focusing element the light collected in an outermost region from the particles with angles of scatter exceeding the maximum angle of scatter of diffracted light for particles in said size range collected over the full length of the path so that the fraction of the collected light transmitted is constant over the radial distance from the axis of said beam represented by those angles of scatter, filtering with said spatial filter the light collected in an outer region within the radial distance from the axis of said beam represented by the angle of scatter of the smallest particles of said size range collected along the full length of said path so that the fraction of the collected light transmitted varies inversely with the radial distance from the axis of said beam, and detecting the magnitude of the total light flux transmitted by said regions as a measure of the total mass of the particles in said size range along the full length of said path.

* * * * *